United States Patent Office 3,293,639
Patented Dec. 20, 1966

3,293,639
TRANSLATION CIRCUITS
Friedrich Ulrich, Stuttgart-Weil im Dorf, Germany, assignor to International Standard Electric Corporation
Filed Nov. 24, 1964, Ser. No. 413,478
Claims priority, application Germany, Dec. 4, 1963, St 21,411; Dec. 5, 1963, St 21,421; Dec. 7, 1963, St 21,430; Dec. 13, 1963, St 21,456, St 21,458 St 21,459; Jan. 24, 1964, St 21,597
32 Claims. (Cl. 340—347)

This invention relates to electrical translation circuits, such as one used to translate a combination in one code into the equivalent combination in a different code.

According to the present invention there is provided an electrical translation circuit, in which a pulse code combination to be translated into its equivalent in a different code form is received parallel fashion and applied to windings on a set of input ferro-magnetic cores, in which a number of electrical coupling loops is provided each individual to one of said input pulse code combinations, in which each said loop threads a selection of said cores such that it is selected when its code combination is applied to said windings, in which there is a set of output ferro-magnetic cores each having an output circuit, each said loop threading a selection of said output cores appropriate to the equivalent in said different code form of that loop's input code combination, and in which when a coupling loop is selected due to the reception of its code combination it is energized, which energization causes output signals from the output circuits of the output cores threaded by that loop, which output signals form the required translation.

Translators such as described herein can be used, for instance, in telephone exchanges for conversion between exchange designation digits and routing digits or for conversion between directory and equipment numbers, or in data processing equipment where it can be used for code conversion or for selecting sub-routines from programme datas.

Embodiments of the invention will now be described with reference to the accompanying drawings, in which.

Figure 1:
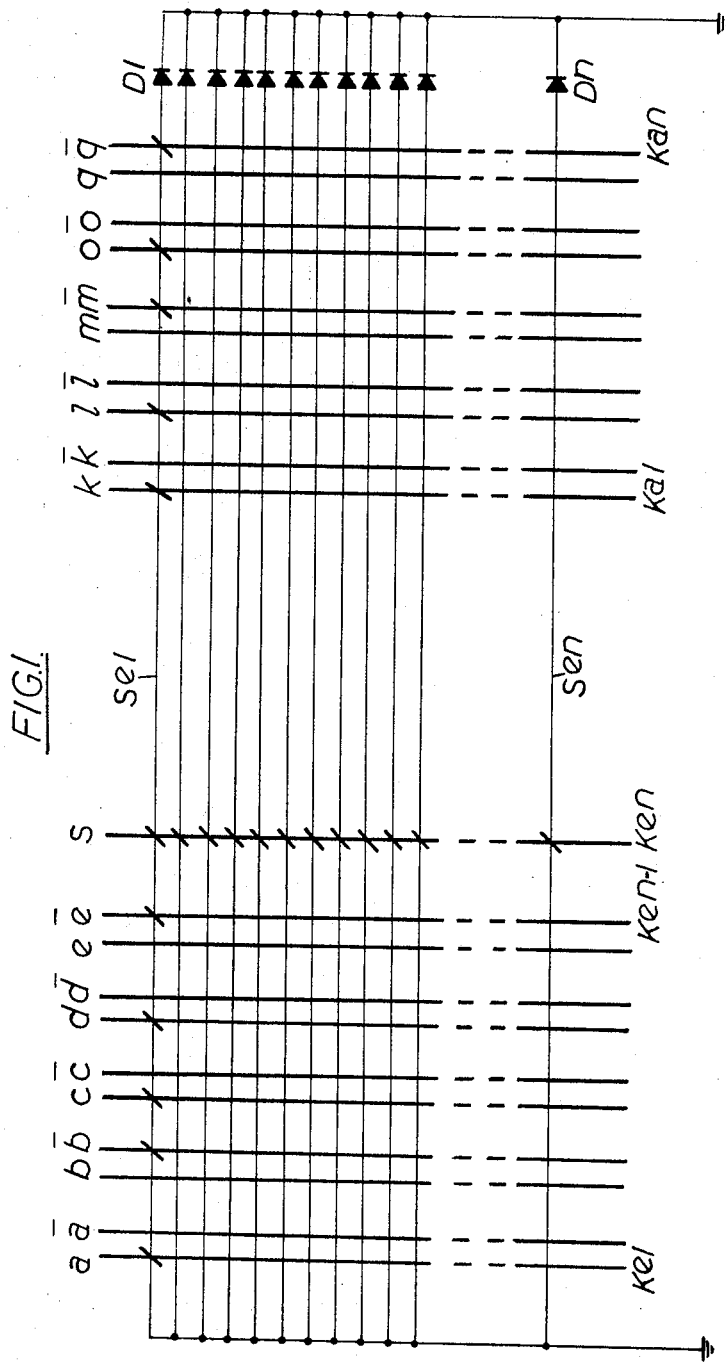
FIG. 1 is a greatly simplified diagram explanatory of the principle of the invention.

In the simplified drawing, FIG. 1, the vertical thick lines represent the magnetic cores. The input-information, i.e. the code combination to be translated, actuates a selection of the input cores K$e$1 to K$en$. For each bit of an input code combination, there is a pair of cores, the cores being on a complementary basis. Thus the input cores are respectively associated with the information bits $a, \bar{a}, b, \bar{b}, c, \bar{c}, d, \bar{d}, e,$ and $\bar{e}$. As usual, the horizontal bar over a letter has the logical signification "not." The core S is actuated on each received code combination as will be described. The output cores K$a$1 to K$an$, one pair per bit, are also allotted complementarily: $k, \bar{k}, l, \bar{l}, m, \bar{m}, o, \bar{o}, q, \bar{q}$. For each translation desired there is a single coupling loop rendered non-linear by the inclusion of diodes D1 to D$n$. Each such loop passes through some of the cores of the input-variables and always passes through core S. Thus the top most loop threads cores $a, \bar{b}, c, d, \bar{e}$ and S. This core S is reversed in its magnetism at each input-information applied, so that it attempts to induce pulses in all loops D1 to D$n$, which pulses tend to make the diodes conductive. The manner in which the cores are threaded by the loops is such that the pulses which S tries to induce in the loops, are inhibited in every loop except that for the received code combination. To achieve this each loop threads all of the cores $a$–$\bar{e}$ *except* those for for its code combination.

Each loop such as S$e$1 is thus so threaded that none of the cores $a$ to $\bar{e}$ which it threads is reversed in its magnetism, when the information $\bar{a}, b, \bar{c}, \bar{d}, e$ (the code for S$e$1) is applied and, therefore, none of the cores affected by the input data causes inhibitory pulses to be induced in the loop S$e$1, so that the diode D1 conducts. Each coupling loop threads a combination of the cores K$a$1–K$an$ of the output group appropriate to the translation for its input code, so that when a loop is pulsed the output cores which it threads function as transformers, each having an output winding. Thereby the cores $k, l, \bar{m}, o, \bar{q}$ are reversed and the output-information is produced. The loops S$e$2 to S$en$ are threaded according to the same principles corresponding to the translations desired. The cores reversed to effect a translation are reset to their normal conditions by separate timing pulses applied either via the windings already mentioned or one or more extra common windings if magnetic cores with rectangular hysteresis loop are used. When using magnetic cores with a linear characteristic, certain protective measures are needed for the flux-changes following the received code combination.

Figure 2:
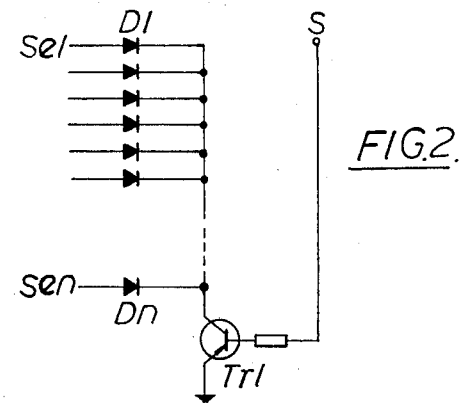
FIG. 2 is a switch usable in conjunction with a translator such as that of FIG. 1.

To ensure that the resetting of the magnetic cores the input-group produce no currents in the electric loops which could cause spurious outputs, the electric loops are interrupted in common as shown in FIG. 2. The loops S$e$1 to S$en$ with the diodes D1 to D$n$ are completed through a switch, e.g. through a transistor-stage T$r$1. As long as an input code combination is present on the control lead S (energised for every translation operation), the transistor T$r$1 is made conductive so that current can flow in the selected loop of S$e$1 to S$en$ and the appropriate output cores can be set correspondingly. When the input disappears the transistor becomes non-conductive and the connection between the input- and the output-end of the translator is completely interrupted. A mutual influence can no more occur when the magnetic cores are reset.

Figure 3:
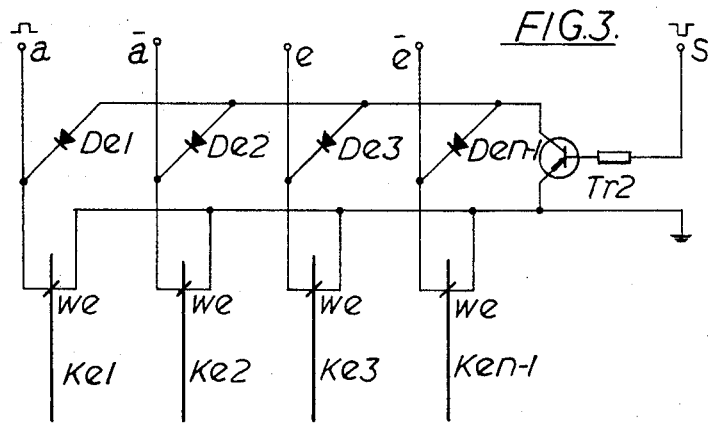
FIG. 3 shows in more detail the input circuits to a translator such as that of FIG. 1.

A magnetic core is provided for each of the input-variables $a$ to $\bar{e}$, and for S: to operate the translator, electrically separate input circuits are provided as shown in FIG. 3. The input-leads $a$, $\bar{a}$ to $e$, $\bar{e}$ (only four of which are shown) are connected to the input windings $we$ of the corresponding magnetic cores K$e$1 etc. When an input lead is marked the magnetic core is reversed in its magnetism and a blocking pulse is thereby induced in all electric loops threaded through that core. The current flowing in the selected electric loop also influences the other magnetic input-circuits. The magnetic input-circuits not having been marked thereby undergo a modified current flux in the opposite direction as compared with the marked input-circuits. This can cause voltage drops in the electric loop and undesired connections. When using magnetic cores with a rectangular hysteresis-loop these undesired connections are largely prevented by the non-linear characteristic of the flux. The effects of the short-term flux-modifications of non-marked input cores can be suppressed at the output-end by a suitable time discrimination. With mostly non-linear magnetic cores these modifications in the current flux can be suppressed by shunt-circuits with a single-end effect. To achieve this, the input-windings $we$ of the crosspoint elements are shunted by diodes D$e$1 etc. These diodes are actuated by the marking current in the blocking directions, so that the flux-reversions are slowed down after the translation has been carried out. For that reason the short-circuits are switched on through a common switch T$r$2 only during the period of an input-information S. The undesired flux-changes in the non-marked cores are thereby prevented and the flux-reversions are, nevertheless, not reduced in speed.

Figure 4:
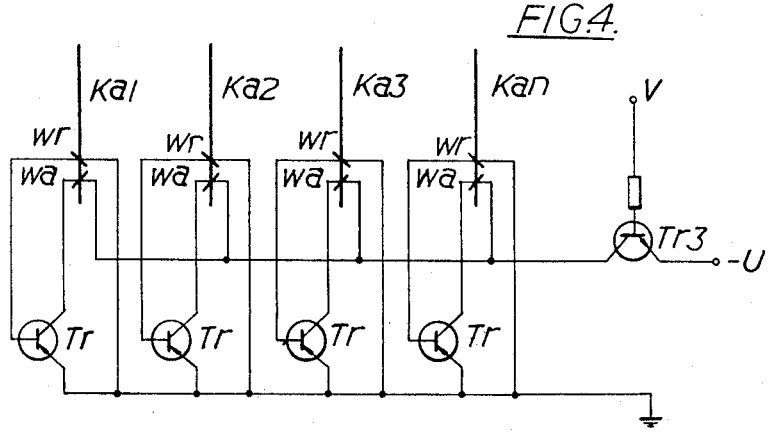
FIG. 4 shows in more detail output circuits of a translator such as that of FIG. 1.

FIG. 4 shows the output-circuits of the magnetic translator according to the invention. Each core of the output-group is equipped with an output-winding $wa$ and a feed-back winding $wr$, connected with a transistor T$r$, to form a blocking oscillator of known type. When a core such as K$a$1 is reversed in its magnetism via the electric loop, the blocking oscillator of that core is excited and gives an amplified output-signal. Since an excited blocking oscillator induces a relatively high counter voltage in the electric loop marked, the diode thereof is actuated in the blocking direction. In view of differences between the individual blocking oscillators it is possible that not all oscillating circuits, necessary for the output-information, are excited, so the output-signals must be stored. To this end the blocking oscillators are connected to the supply voltage —U via a transistor-stage T$r$3, delayed through the signal V. The output signals at first operate the bases of the respective transistors T$r$, thereby storing an internal base-charge. This ensures that all transistors requested become conductive, independent of a further application of input-signals, if the blocking oscillators are connected with the supply voltage.

Figure 5:
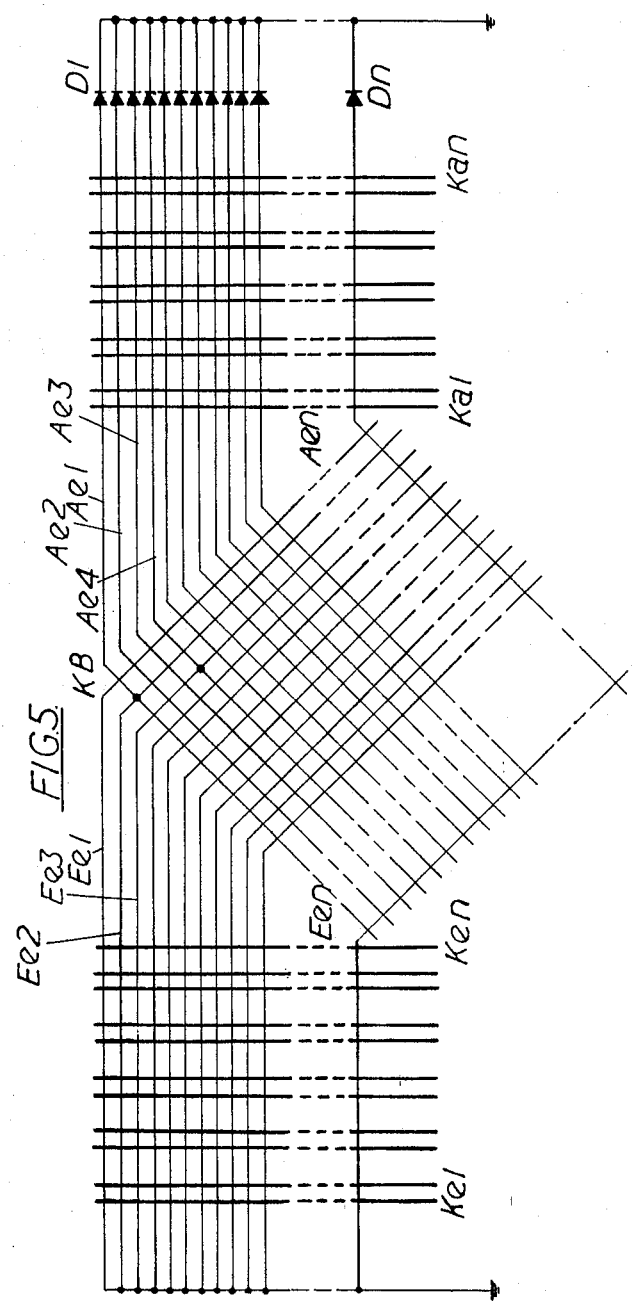
FIG. 5 is a translator embodying the principles of FIG. 1, in which the translations provided can readily be varied.

It is frequently desirable in translator circuit arrangements to change the respective translations quickly and simply. FIG. 5 shows that this can be performed in a very simple manner using the translator according to the invention.

The $n$ electric loops of the translator between input- and output-core K$e$1 to K$en$ and K$a$1 to K$an$ are each broken into two portions. Thus $n$ outputs E$e$1 to E$en$ of the input-group and $n$ inputs A$e$1 to A$en$ of the output-group are obtained. These outputs and inputs can be connected in pairs as required through a coupling arrangement KB. For example, the outputs E$e$2 and E$e$3 are shown connected to the inputs A$e$1 and A$e$4. A new translation for any given code is achieved by removing the existing connection for that code and inserting a new connection for it.

The arrangement KB could be a co-ordinate array of conductors, one set connected to respective ones of E$a$1, etc. and the other set connected to respective ones of A$e$1 etc. Each connection is made by a simple connecting plug inserted in the board of insulating material carrying the array at a point appropriate to the conductor to be interconnected.

Figure 6:
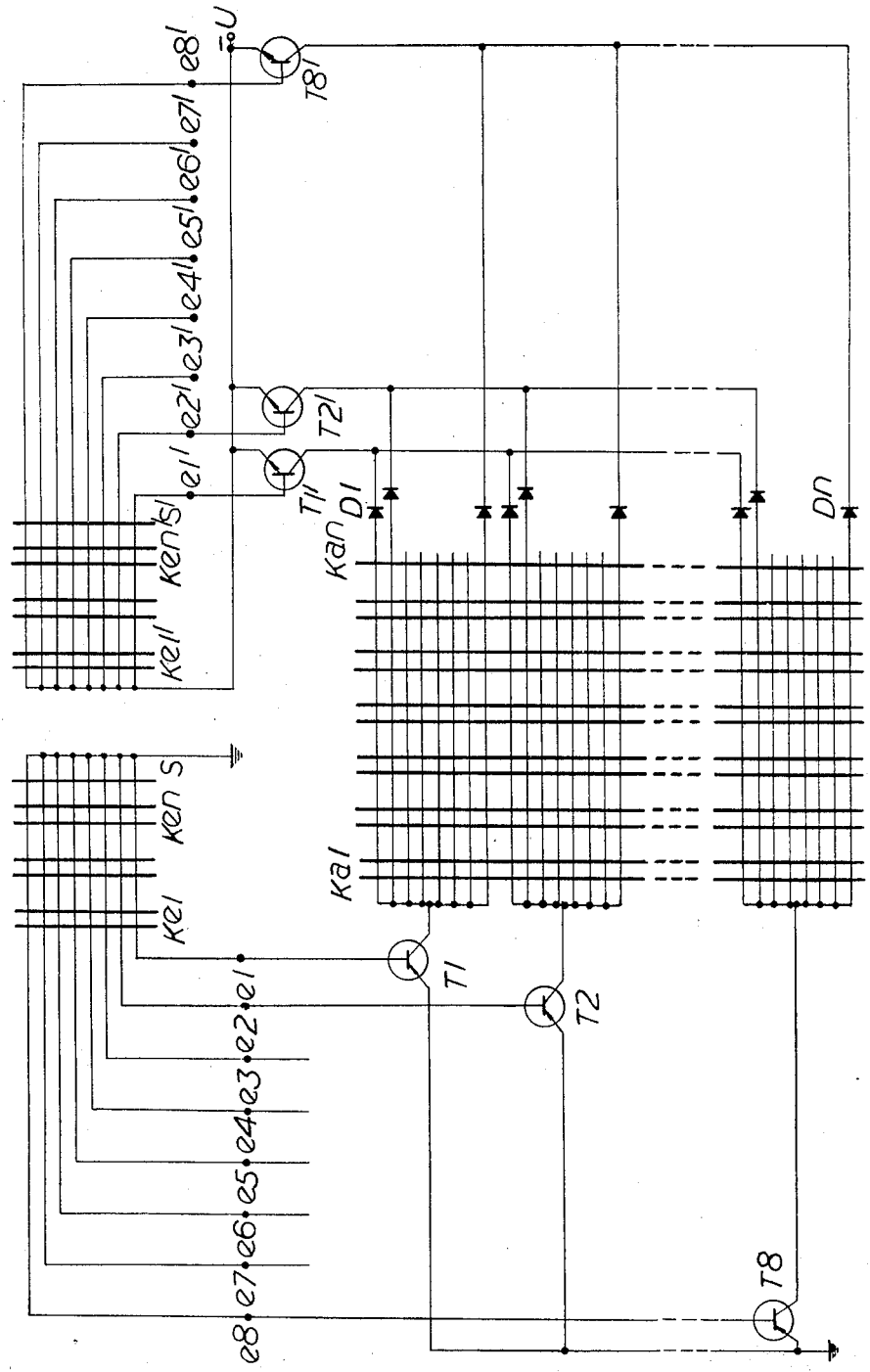
FIG. 6 is a translator in which the input magnetic cores are arranged in two sets.

FIG. 6 shows a magnetic translator modified to allow of a simpler threading of the electric loops. The cores K$e$1 to K$en$ form one group and the cores K$e$1' to K$en$' form a second group of input-cores, part of an input code being applied via input windings (not shown) to cores of one group and part to cores of the other group. Each of these groups is threaded by a number of electric loops $e$1 to $e$8, and $e$1' to $e$8' respectively. The groups of loops are connected with the electric loops threading the cores K$a$1 to K$an$ of the output-group via amplifiers T1 to T8 and T1' to T8'. Each of these amplifiers controls a number of the electric loops of the output-group, and each loop of the output group is controlled by one amplifier of each set of amplifiers. Thus when a translation is performed, current flows only through one of the electric loops of the output-group of the transistors of that loop have been selected. When the input-information shows $n$ variables 2, $2^n$ translations can be made through the same number of electric loops. When the input variables are subdivided into two groups, each with $n/2$ variables, the number of electric loops in the input group is reduced to $2n/2$ and the total number of electric partial loops is then $2 \times 2n/2$. The expenditure for amplifier elements between input-groups and output-groups is comparatively small.

Figure 7:
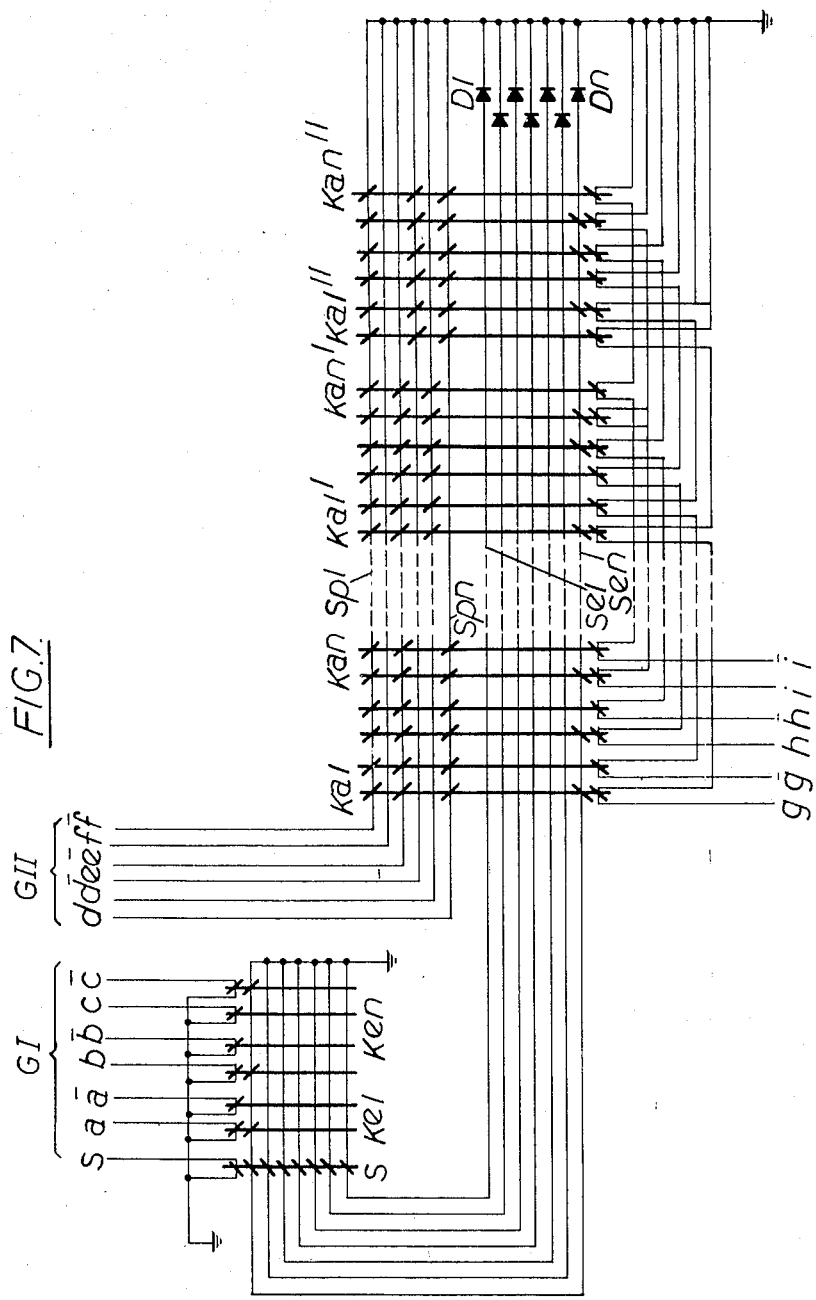
FIG. 7 shows a translator using the principles described with reference to FIG. 1, but in which there are several groups of output cores, and part of the input information selects one of those groups when a translation is to be made.

In FIG. 7, the input information is supplied in two portions over groups of inputs GI and GII. The group GI is applied to the inputs S, $a$, $\bar{a}$, $b$, $\bar{b}$, $c$, $\bar{c}$, and the group GII to the inputs, $d$, $\bar{d}$, $e$, $\bar{e}$, $f$, $\bar{f}$. Each input character of the group GI effects the input circuit of one of the cores S, K$e$1 to K$en$. These input cores control the electric loops S$e$1 to S$en$ as in FIG. 1. Thus when an input code to be translated is applied, one of these said loops is selected in the manner already described. That is, the magnetic core S is reversed and tries to induce pulses into all loops such as S$e$1 which would find diodes D1 and D$n$ conductive. Blocking pulses are, however, induced in the loops S$e$1 to S$en$ via such of the cores K$e$1 to K$en$ as received input signals, which blocking pulses oppose the pulse due to the core S in all loops except that for the received signal.

Thus if the partial information $a$, $b$, $c$ is only applied the loop S$e$1 is unblocked. This loop like the other loops can cause several different output translations to be produced, as indicated on the drawing by the groups of output cores K$a$1 to K$an$, K$a$1' to K$an$' and K$a$1'' to K$an$''. Then loop S$e$1 can produce in the group K$a$1 to K$an$ the information $g$, $h$, $i$; in the group K$a$1' to K$an$' the information $g$, $\bar{h}$, $i$; and in the group K$a$1'' to K$an$'' the information $\bar{g}$, $\bar{h}$, $i$. Which of these output information items will be obtained depends on the partial information applied to the input control leads $d$, $\bar{d}$, $e$, $\bar{e}$, $f$, $\bar{f}$. These input control leads are connected directly to the block-leads S$p$1 to S$pn$ of the output group. The cores of the group K$a$1 to K$an$ are effective for translation when the input information $\bar{d}$, $e$, $f$ is applied, since group K$a$1' to K$an$' is blocked via the lead $\bar{d}$ and the group K$a$1'' to K$an$'' is blocked via the lead $e$. Therefore in this case the output signal, i.e. the translation, $g$, $h$, $i$ is obtained. The group K$a$1' to K$an$' is enabled and so the output information $g$, $\bar{h}$, $i$, detained if the partial information $d$, $e$, $f$, is applied. The output information $\bar{g}$, $\bar{h}$, $i$ occurs if the output group K$a$1'' to K$an$'' is enabled by the input information $\bar{d}$, $\bar{e}$, $f$. When the input information shows $n$ variables it is known that $2^n$ translations can be made. When the input variables are divided into two groups, each group having $n/2$, only $2^{n/2}$ electrical loops are required. The output side shows $2^{n/2}$ output groups under the full use of all $2^n$ translations possible. Thus the wiring is simpler than in the case of FIG. 1.

Figure 8:
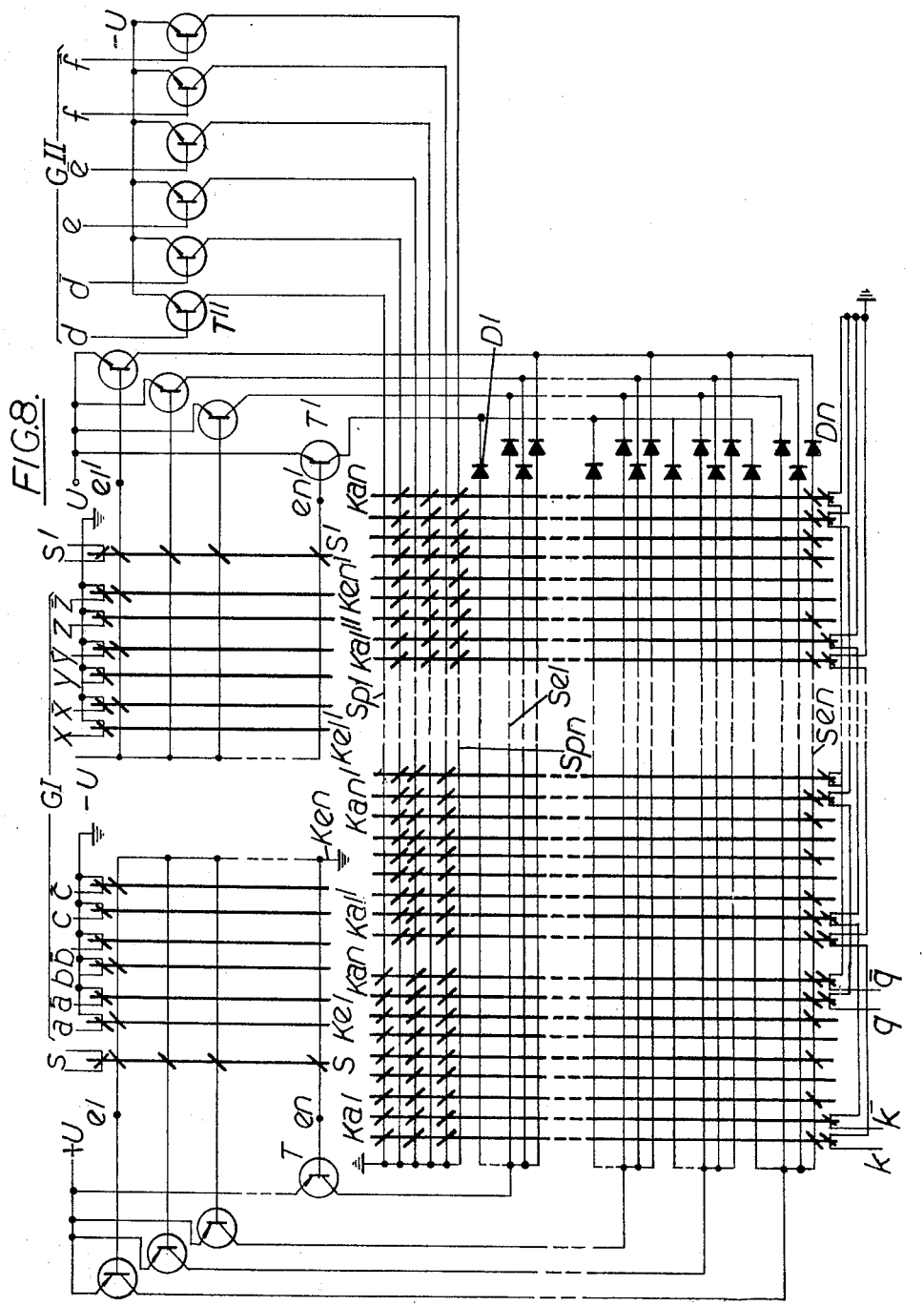
FIG. 8 shows an arrangement in which the input cores are also subdivided into groups.

In FIG. 8, an output loop of $Se1$ to $Sen$ is selected by coincidence of selection of two input partial loops one of $e1$ to $en$ and one of $e1'$ to $en'$ as in FIG. 6. For instance, partial information $S$, $a$, $\bar{a}$, $b$, $\bar{b}$, $c$, $\bar{c}$ selects a loop of $e1$ to $en$ and the second partial information $S'$, $x$, $\bar{x}$, $y$, $\bar{y}$, $z$, $\bar{z}$ selects a second loop of $e1'$ to $en'$. The control pulses in the selected loops each operate one of the transistors $T$ and $T'$ so that only one output loop $Se1$ to $Sen$ receives potential from both sides, leading to a current flux. As in FIG. 6, transistor $T$ of one set are npn while those, $T'$, of the other set are pnp. The output group to be used is selected by the partial information $d$, $\bar{d}$, $e$, $\bar{e}$, $f$, $\bar{f}$, so that this circuit includes features of FIGS. 6 and 7. If, for example, the input information $S$, $\bar{a}$, $\bar{b}$, $c$, $S'$, $x$, $y$, $z$, $d$, $e$, $f$ is applied, so that the code to be translated (ignoring the control pulses as $S$, $S'$) is 001000000, an output signal occurs on the loop $Sen$, this being selected by the first 6 bits of the input while the last 3 bits select the output group $Ka1''$ to $Kan''$. The partial loop $e1$ is selected by the partial information $S$, $\bar{a}$, $\bar{b}$, $c$, the control pulse due to the reversal of core $S$ sending the appropriate transistor $T$ conductive so that potential $+U$ is applied to a group of outlet loops which includes the loop $Sen$. The partial loop $e1'$ is selected by the partial information $S'$, $x$, $y$, $z$ and the control pulse (due to $S'$) causes the pertinent transistor $T'$ to conduct and apply the potential $-U$ to the other side of a group of output leads. Of the marked output loops, the loop $Sen$ is the only one which receives the marking potential on either side simultaneously so only this loop passes a current. Which of the output information items, which can be furnished by this loop, is obtained depends on the partial information $d$, $\bar{d}$, $e$, $\bar{e}$, $f$, $\bar{f}$. When the information $d$, $e$, $f$ is applied the output group $Ka1''$ to $Kan''$ is enabled so that the output information appropriate to the loop $Sen$ occurs on the communal outputs $k$, $\bar{k}$ ... $q$, $\bar{q}$. The output groups $Ka1$–$Kan$ and $Ka1'$–$Kan'$ are then blocked via at least one of leads $Sp1$ to $Spn$.

Figure 9:
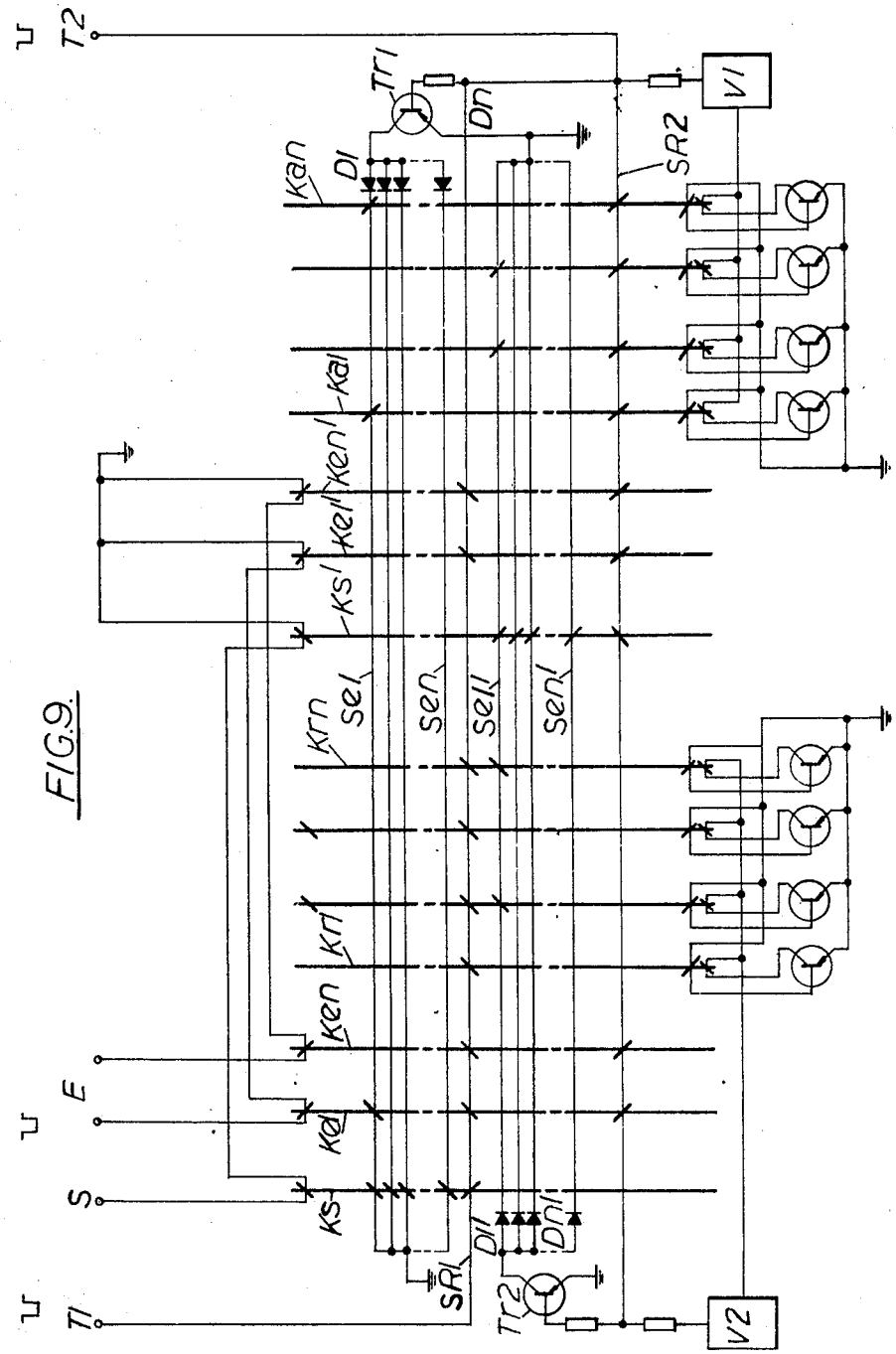
FIG. 9 is a sequentially-operable circuit based on the use of two arrangements each generally as described with reference to FIG. 1.

The circuit of FIG. 9 has two groups of magnetic cores, the first group including cores $Ks$, $Ke1$–$Ken$ and $Kr1$–$Krn$, while the second group includes $Ks'$, $Ke1'$–$Ken'$ and $Ka1$–$Kan$. The coupling loops of $ks$, $Ke1$–$Ken$ co-operate with cores $Ka1$–$Kan$ and the loops of $Ks'$, $Ke1'$–$Ken'$ co-operate with $Kr1$–$Krn$.

It is assumed that initially $Kr1$–$Krn$, by their conditions of magnetisation store an information item, a new item of information to be dealt with is offered to the input cores of both groups, as can be seen from the manner in which the input windings are wound. This new item can thus affect both sets of cores: its application followed by a pulse $T1$ in the "resetting" sense, which, via the resetting loop $SR1$ resets to the rest condition cores $Ke1$–$Ken$ and $Kr1$–$Krn$ of the first group and $Ke1'$–$Ken'$ of the second group. This resetting causes a pulse to be induced via the additional core $Ks$ of the first group (note that $SR1$ does not thread the additional core $Ks'$ of the second group) into the non-linear loops $Se1$–$Sen$, which all thread $Ks$, and which combinatorially thread $Ke1$–$Ken$. The threadings of the input cores are such that this pulse is opposed and rendered ineffective in all loops except that for the loop corresponding to the received code. This loop, and indeed all loops $Se1$–$Sen$, is rendered effective at $T1$ by $Tr1$, so the loop sets a combination of cores $Ka1$–$Kan$ which represents the wanted translation.

Thus at $T1$, an input information sets the input cores of the first group, which causes the translation to be set into the output cores of the second group.

The next input information comes at $T2$, and is also offered to both sets of input cores, those for the second group having been reset at $T1$. $T2$, via loop $SR2$, resets $Ke1$–$Ken$ (ready for the next input during the next pulse $T1$) and all cores of the second group. Hence the resetting, via loop $SR2$, induces a pulse into the loops $Se1'$–$Sen'$ and only in one loop—that for the new input information is this pulse not inhibited. It sets a translation into cores $Kr1$–$Ken$, $Tr2$ unblocking at $T2$.

Hence at $T2$ an input information sets the input cores of the second group causing the translation thereof to be set into the output cores of the first group.

As in FIG. 3, the output windings of the output cores form windings of blocking oscillators. The voltage reaches the transistor via delays $V$, so that the input of information from a core is stored in the transistors' base inputs due to transistor characteristics, the slightly delayed supply voltage ensuring that the blocking oscillator called for an output can respond and reverse the associated cores.

If separate outputs are needed for translations the loops $Se1$–$Sen$, $Se1'$–$Sen'$, pass through further cores for those translations two or more sets of output cores can be provided here, as in the other circuits described when outputs in two or more code forms are needed.

Figure 10:
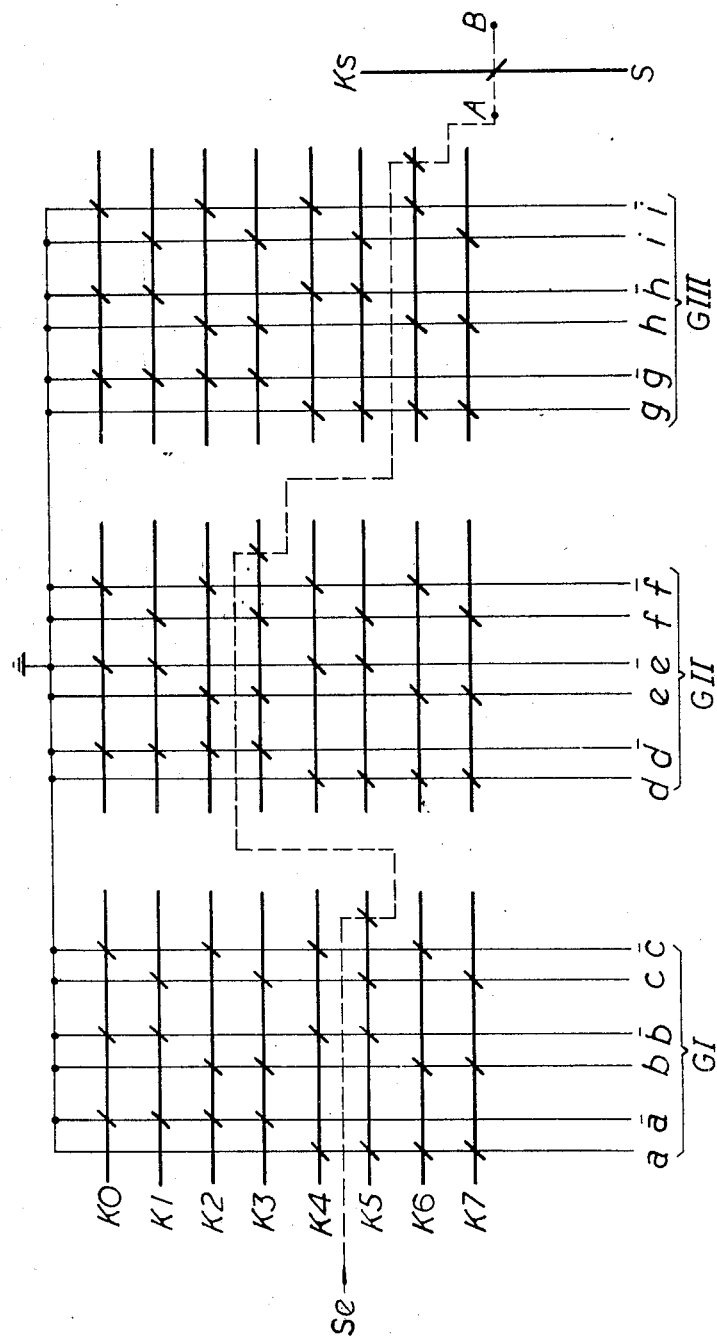
FIG. 10 shows the input cores of a translator such as that of FIG. 1, but in which the input cores are in groups to simplify wiring.

In FIG. 10 there are three groups GI, GII, and GIII of cores, each including eight cores $K0$ to $K7$. The entire input information $a$, $\bar{a}$ to $i$, $\bar{i}$ is subdivided into three partial information items $a$, $\bar{a}$ to $c$, $\bar{c}$; $d$, $\bar{d}$ to $f$, $\bar{f}$; $g$, $\bar{g}$ to $i$, $\bar{i}$. For each partial group there are $2^n$ magnetic cores where $n$ is the number of bits (input variables) in one partial group. Therefore eight cross-point elements $K0$ to $K7$ must be provided for three input variables (e.g. $a$, $b$, $c$) as each partial group is actuated in a binary manner. Note that the partial information items can have different numbers of bits, as can the partial core groups. A magnetic core is selected, if it is not threaded by any input line marked by input information. When the input information $\bar{a}$, $b$, $\bar{c}$, is applied the cross-point element $K5$ of the partial group GI is selected. The same input information blocks all other cores of that partial group. The input lead $a$ for example controls the cores $K4$, $K6$, $K7$. The alignment is so selected that with complementary inputs all cores not selected are blocked via at least through one input line. Each input information also reverses an additional core which is threaded by a wire such as $Se$ for every input information item $a$ to $\bar{i}$ which is to be dealt with. During this reversal an impulse is induced in all of these electric loops because they all pass through the core $Ks$. The pulses induced by the cores of the input groups oppose those due to the core in all $Se$ loops except one. As an example, the core $K5$ of group GI, core $K3$ of group GII and core $K6$ of group GIII are selected when the input information is: $\bar{a}$, $b$, $\bar{c}$, $d$, $\bar{e}$, $\bar{f}$, $\bar{g}$, $\bar{h}$, $i$. Since the loop $Se$ ... threading these cores receives no block pulses, i.e. in that loop the pulse due to the additional core is effective.

Figure 11:
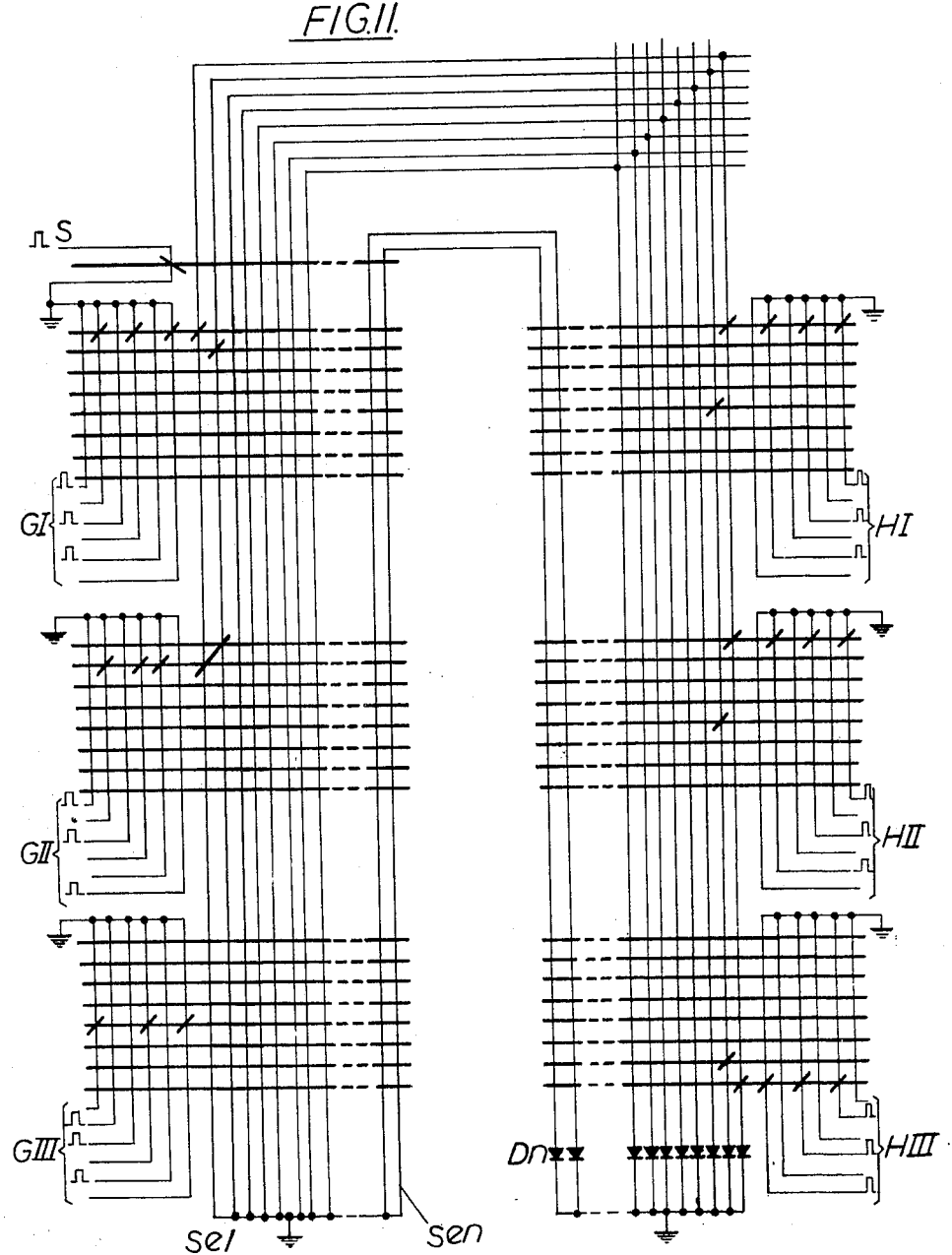
FIG. 11 is a simple representation of a translator using the idea of FIG. 10.

FIG. 11 shows how the impulse in the selected electric loop causes the cores of output groups HI, HII, and HIII representing the translation to be reversed thereby giving the output information. For the groups GI, GII, GIII to which the input information is applied (as shown by the pulses) loop $Se1$ is effective, and the translation selected by this information is indicated at the output groups HI, HII, HIII.

Figure 12:
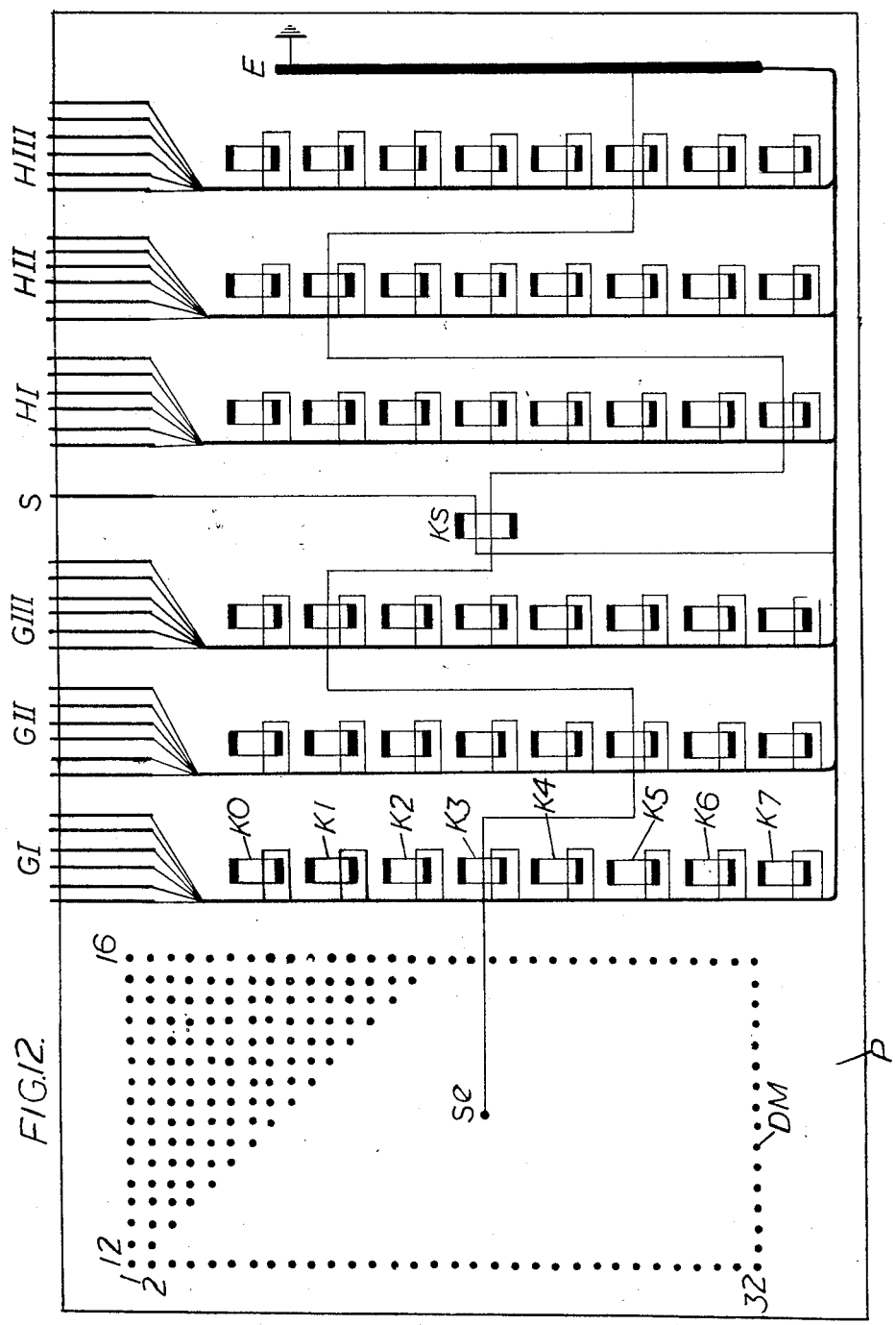
FIG. 12 is a structure for a translator such as that of FIG. 11.
Figure 13:
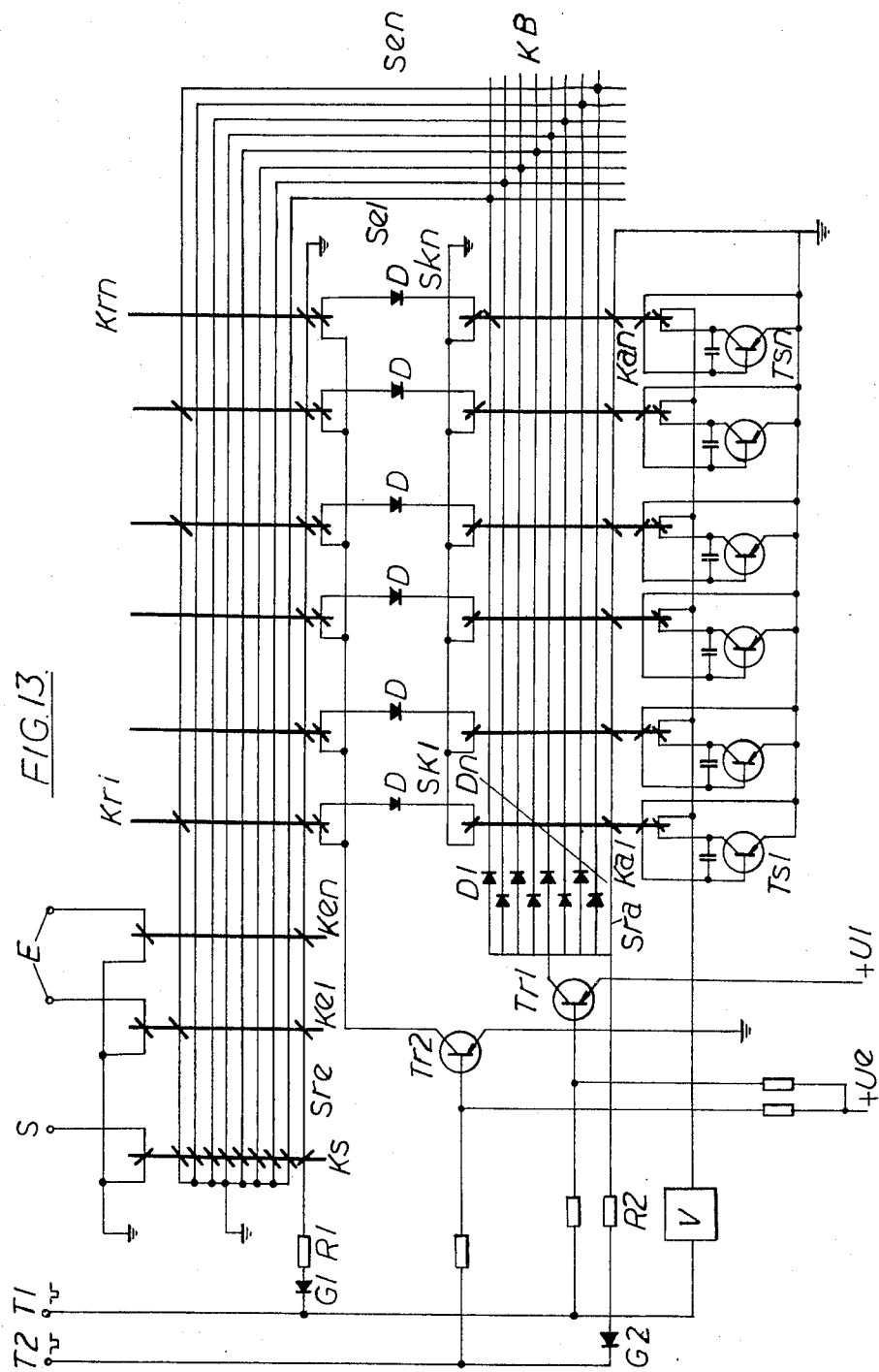
FIG. 13 shows a translator in which the output from the device can be fed back to the input thereof.

FIG. 13 is a practical realization of the translator of FIG. 12: the cores $K0$–$K7$ of a partial group are mounted in a column, three such columns being shown, on a plate P of an insulating material. The common core $Ks$ is also mounted on the plate P, as are the three sets of output cores shown to the right of core $Ks$. The magnetic circuits of the cores are split so that a cable harness forming the leads can be filled in.

The plate has at its upper edge input terminal strips GI, GII, GIII, S and also output terminal strips HI, HII and HIII. The input wires and output wires are arranged as shown, and all terminate on a common grounding strip E of insulating material.

The coupling loops such as S$e$ each commence from one of the terminals of a matrix DM of such terminals, and each passes through a core in each of the input partial groups, core K$s$, and the appropriate selection of output cores (here a loop could thread two or more output cores in the same group), and terminates on the bus bar E.

The diodes in the loops are connected to the other side of the plate P, each being connected to the appropriate terminal of the matrix DM.

When the wiring is all inserted, the arrangement is completed by a second plate (not shown) which is either of a low reluctance magnetic material to complete all cores' magnetic circuits, or is of insulating material with a set of half-cores, one per half core on plate P.

In FIG. 13, as usual, thick lines K$s$, K$e$1 to K$en$ and K$r$1 to K$rn$ represent cores of the input end of the translator. Assume that initially cores K$r$1 to K$rn$ are at rest: the circuit operates as follows:

The remaining cores of the input end are set or not set via inputs S and E so that the corresponding translation can be made. During this setting, transistor T$r$1 is nonconductive and the non-linear electric loops S$e$1 to S$en$ are interrupted. The cores at the input end are not connected to the cores at the output end, because feed-back loops S$k$1 to S$kn$ are also interrupted through transistor T$r$2. During a first timing pulse T1 all cores of the input end are restored via the resetting loop S$re$, which loop includes a diode G1 and resistor R1, and core K$s$ is operated: hence an impulse is induced on all loops S$e$1–S$en$, which thread K$s$ as transistor T$r$1 now conducts. These pulses oppose pulses induced by the restored crosspoint elements K$e$1 to K$en$ and K$r$1 to K$rn$. The loops S$e$1 to S$en$ are so threaded that for each complete input information item only in one loop is the pulse induced by the core K$s$ not cancelled. The pulse in the thus-selected loop causes current flow through one of the diodes D1 to D$n$ and thereby sets the associated cores K$a$1 to K$an$ of the output group. Via a delay member V the supply voltage is applied to the blocking oscillators transistors T$s$1 to T$sn$ due to the timing pulse T1. In the meantime the associated output information was stored in temporary storages in the input circuit of the blocking oscillators. When switching on these blocking oscillators it is ensured that the cores of the output group participating are safely reversed. Any impairing effect on the cores at the input end is thus prevented, as the feed-back loops S$k$1 to S$kn$ are still interrupted at transistor T$r$2 and the diodes D1 to D$n$ of the loops S$e$1 to S$en$ are in the blocking direction for such influencement. When the pulse T1 ends the translation is completed and the cores K$a$1 to K$an$ are set correspondingly. The loops S$e$1 to S$en$ are again interrupted at transistor T$r$1. In timing pulse T2, which follows T1, the feed-back loops K$s$1 to K$sn$ are completed through the transistor T$r$2, so that the cores K$a$1 to K$an$ of the output end, set for the translation at T1, are restored through a restoring loop S$ra$, which has in series with it a rectifier G2 and a resistor R2. Thereby the cores K$r$1 to K$rn$ of the input end are set via the feed-back loops in compliance with a part or the entire output information, irrespective, whether between the timing pulses T1 and T2 or during, or after T2 the cores K$s$, K$e$1 to K$en$ on the input end are set. Since the loops S$e$1 to S$en$ are interrupted through transistor T$r$1 the output end of the translator is disconnected from the input end through this means.

If all partial groups of cores (K$e$1 to K$en$, K$r$1 to K$rn$) of the input end are set to a complete information, the new step of the sequence-operating switching circuit can be performed using the portion of the output information led back.

When a periodic sequence is determined the setting of the cores K$r$1 to K$rn$, mentioned above, can be omitted. The output information gained during the last step furnishes the starting position of the crosspoint elements K$r$1 to K$rn$ for the first step.

The input information (S, E), further led to the sequence operating switching circuit, can be limited to one counting pulse, only if the switching circuit is used as a pulse-toroidal counter. The stepping programme can be initiated by a single starting pulse when code generators are used. Thereupon the entire programme runs down during the timing pulses T1 and T2. The switching circuit furnishes successively all possible code signals of a defined code.

There are many variants of the switching circuit possible which only depend on the particular use desired. This especially refers to the kind of the input information and the co-operation of the timing pulses T1 and T2 with said information items. The basic principle of the derivation of the programme sequence, via the translator, always remains, however, as shown by this invention.

When a separate output information is desired for each translation the non-linear electric loops are led in addition through another group of magnetic crosspoint elements, corresponding to the translations desired.

Figure 14:
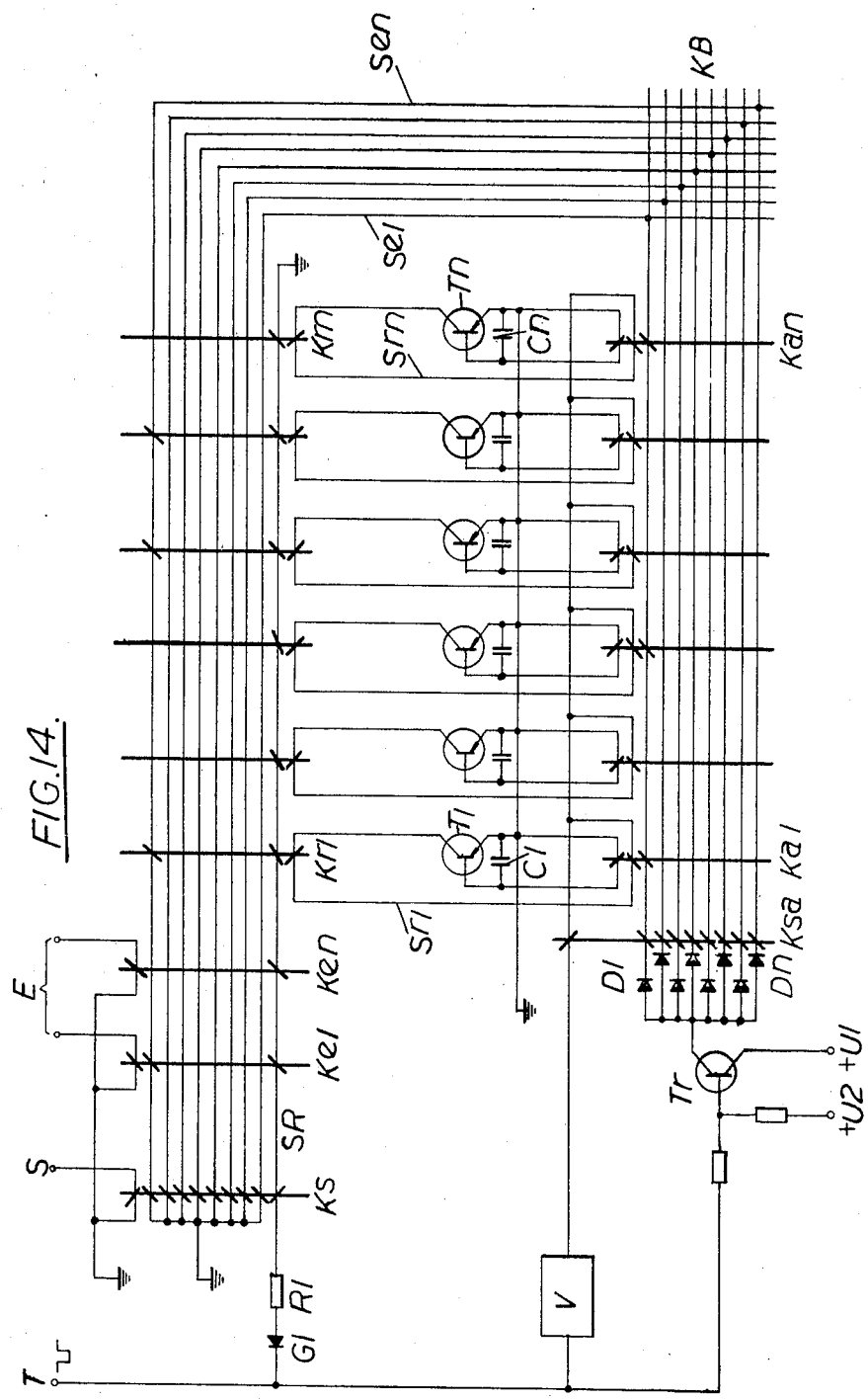
FIG. 14 is a modification of the circuit of FIG. 13.

The only important difference between FIG. 14 and FIG. 13 is that in FIG. 14 the feedback loops between K$a$1–K$an$ and K$r$1–K$rn$ include blocking oscillators switched on by a timing pulse after a delay via a device V. Hence a single pulse "cycle" is detainable. At T, all input cores are reset, so the reversal of K$s$ causes one loop to be energized to set a selection of K$a$1–K$an$, whose change-overs charge capacitors such as C1 in the blocking oscillators' inputs. When power is switched on the relevant oscillators operate to set some of the input cores.

Figure 15:
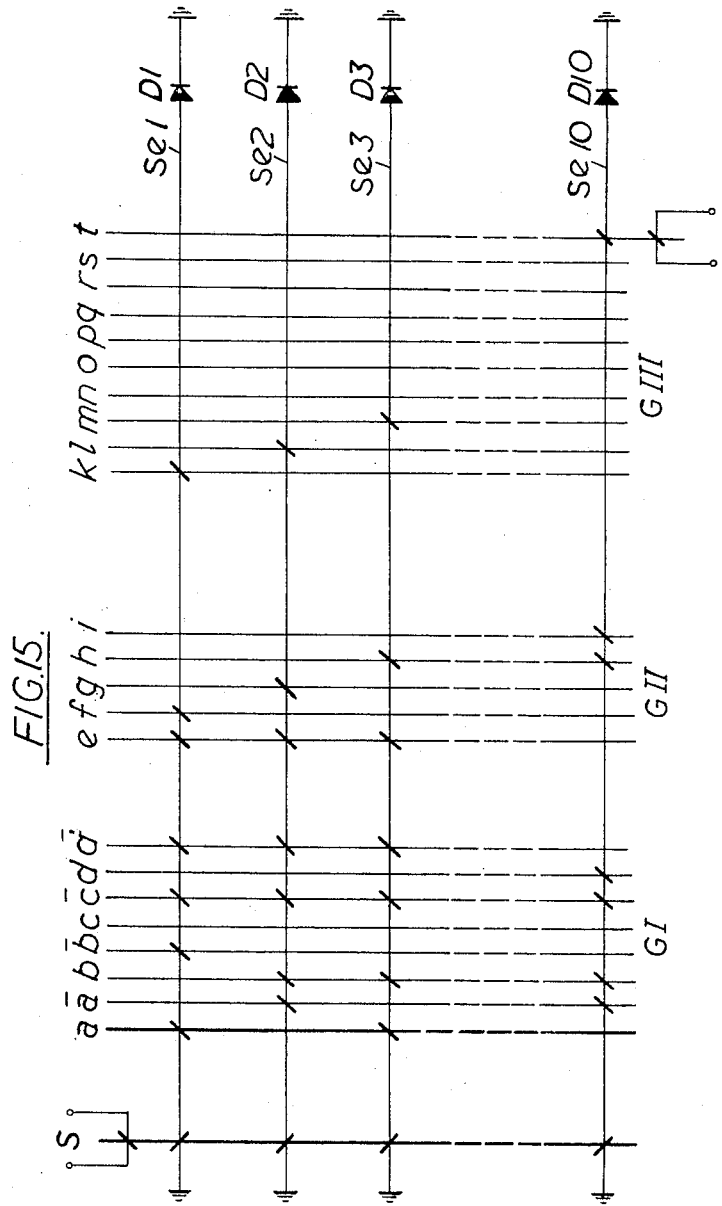
FIG. 15 shows a translator catering for alternative translations.

In FIG. 15 there are three sets of cores in addition to the common core: one for pure binary rotation (true and complement), one for a two-out-of-five code and one on a one-out-of-ten basis. If the input codes are applied via inverters, i.e. for binary 1 one feed in $\bar{a}$, $b$, $c$, $d$, then the device shown is a both way translator.

While the principles of the invention have been described above in connection with specific apparatus and applications, it is to be understood that this description is made only by way of example and not as a limitation on the scope of the invention.

I claim:

1. An electrical translation circuit, which includes a set of input ferro-magnetic cores each having an input winding, means for applying a code combination to be translated into the equivalent code form in parallel fashion to appropriate ones of said input windings, electrical coupling loops individual to each of a plurality of code combinations, means including each of said loops threading a combination of said input cores operated responsive to a code combination to be translated applied to said input winding to induce inhibiting conditions into all of said loops except the loop individual to the received code combination to be translated, a set of output ferro-magnetic cores each of which has an output winding, each said loops threading selected ones of said output cores such that when one of said loops is energized output signals are obtained from the selection of said output windings which represents the loop's code combination's translation, means including each of said loops coupling cores which are not energized on reception of its code combination to the input windings, energized input winding means for causing an inhibiting pulse to be induced in all loops threading said coupled cores in a first sense, means for applying said operating pulse to all of said loops via an input winding on a further core threaded by all of said loops, said operating pulse being induced into each said loop in the reverse sense to said inhibiting pulses, and a non-linear device in the low resistance condition for an operating pulse included in each said loop.

2. A circuit as claimed in claim 1 wherein the input cores are divided into two sets, means for controlling each of said sets responsive to a different part of the code combinations to be dealt with, means included in each of said sets for controlling a different set of loops, means for controlling each partial loop which threads a combination of output cores to be energized responsive to the selection of one input partial loop in each said set, means including each of said partial loops of an input set for actuating one of two transistor switching means, and means responsive to the actuation of said two transistor switching means for selecting the appropriate two partial loops and consequently selecting a single one of the output partial loops.

3. The circuit of claim 1 wherein said non-linear devices are semiconductor diodes.

4. The circuit of claim 1 wherein feedback winding means are associated with each of said output cores, and a first transistor means cooperating with said feedback winding means for forming a blocking oscillator.

5. The circuit of claim 4 wherein said output windings are all connected to the supply voltage through a common switch.

6. The circuit of claim 5 wherein the electric coupling loops between said input and output cores are each separated into two parts, and switch block means interconnecting said two parts as required.

7. The circuit of claim 6 wherein cores with rectangular hysteresis loops are used and wherein timing means are provided to reset to normal position after a translation of said cores.

8. The circuit of claim 7 and means to preset said input cores before each translation.

9. The circuit of claim 8 wherein means are provided for interrupting said loops at each restoring or presetting of said cores.

10. A sequence operating switching circuit, including two translation circuits each as claimed in claim 1 comprising, means responsive to a first timing pulse for causing the cores of a first of said circuits to act as the input end of a translator and cores of a second of said circuits to act as the output end of said translator, means including the loops of the first translation circuit providing connection between the input end and the output end, means responsive to a second timing pulse for causing the cores of the first translation circuit to act as the output end and the cores of the second circuit to act as the input end of said translator, and means including the loops of the second translation circuit providing connection between the input end and the output end.

11. The circuit of claim 10 comprising means for simulataneously applying input information to windings of the cores of both translation circuits, means for restoring the cores of the second translation circuit during the first timing pulse, and means for restoring the cores of the first translation circuit during the second timing pulse.

12. The circuit of claim 11 wherein the cores used as output cores each forms part of a blocking oscillator.

13. The circuit of claim 12 wherein delay means are provided for applying the supply voltage for the blocking oscillators with a certain delay during the timing pulses.

14. The circuit of claim 10 wherein the means of restoring all cores of the first translation circuit and the input cores of the second translation circuit during the first timing pulse include a common restoring loop.

15. The circuit of claim 14 comprising an additional core, and means for actuating said additional core when the cores of the first translation circuit are set and restored.

16. The circuit of claim 15 wherein means are provided leading all the loops of the first translation circuit through said additional core.

17. The circuit of claim 16 and means for causing the pulses from said additional core induced into the loops of the first translation circuit to be of opposite sense to the pulses induced by the remaining cores of the first translation circuit.

18. The circuit of claim 10 and further common restoring loop means for restoring all set cores of the second translation circuit and the input cores of the first translation circuit during the second timing pulses.

19. The circuit of claim 18 includes a further additional core and means for actuating said further additional core during the setting and during the restoring of the cores of the second translation circuit.

20. The circuit of claim 19 and means for leading all loops of the second translation circuit through said further additional core.

21. The circuit of claim 20 and means for causing the pulses from the further additional core induced into the non-linear electric loops of said second translation circuit to be of opposite polarity to the pulses induced by the remaining cores of said second translation circuit.

22. An electrical translation circuit including input ferro-magnetic cores each having an input winding, which cores are subdivided into a plurality of groups of cores, means for applying in parallel fashion to appropriate ones of said input windings a code combination to be translated, an electrical coupling loop for each code combination to be dealt with, each of said loops threading a combination of said input cores which may include cores in more than one of said groups such that when a code combination to be translated is applied to said input windings inhibiting conditions are induced into all of said loops except the one for the received code combination, a set of output ferro-magnetic cores each of which has an output winding, each of said loops threading a selection of said output cores such that when one of said loops is energized output signals are obtained from a selection of said output windings which represents the translation corresponding to that loop's code combination, means fo applying an operating pulse to all of said coupling loops when a translation is to be done, so that when a code combination to be translated is applied to the input windings of said groups of input cores the operating pulse is inhibited in all loops except that for the received code combination, the uninhibited loop being one which does not thread an input core in any one of said groups whose input winding is energized when the code combination is applied, a semiconductor diode in the low impedance condition for an operating pulse included in each said loop which threads a combination of said input group's cores so that only the diode in the uninhibited loop is unblocked when a translation occurs, means for actuating the input groups contradictory in a complementary manner, and means for selecting associated cores in a binary manner.

23. A circuit according to claim 22 and in which said means for applying an operating pulse to all of said loops includes an additional ferro-magnetic core which is reversed in its magnetism when an input code combination is applied, said additional core being threaded by all of said loops so that when reversed by a pulse applied to its winding said operating pulse is induced into said loops.

24. A circuit accrding to claim 23 modified in that there are a plurality of said additional cores which are actuated in parallel when an input information is applied and means for distributing said loops over said additional cores.

25. A sequence operating switching circuit including a magnetic translation circuit as claimed in claim 1 in which the cores of the input and of the output end connected through said loops are used as storages, means responsive to input information supplied to said sequence operating circuit for setting some of the input cores, means for resetting all input cores which are set during a first timing pulse whereby the corresponding translation is performed and the respective cores of the output end are set to the conditions for the translation, means for resetting the output cores which are set during a second timing pulse, and means including the output cores for setting the input cores not set by the input information.

26. A switching circuit according to claim 25, a transistor switching stage for coupling the input and output cores via said electric loops and means for causing said transistor switching stage to be made conductive during the first timing pulse.

27. A switching circuit according to claim 25 in which each input and output variable of the circuit a magnetic core is associated, and separate control windings for electrically setting said input cores.

28. A switching circuit according to claim 25 and in which the output circuits of the cores of the output end are blocking oscillators.

29. A switching circuit according to claim 28 and in which delay means are provided for applying the supply voltage to the blocking oscillators during the first timing pulse with a delay.

30. A switching circuit according to claim 25 and in which said output core-input core connections are through non-linear electric loops.

31. A switching circuit according to claim 30 and in which the output core-input core couplings are through-connected during the second timing pulse by a transistor switching stage.

32. A circuit as claimed in claim 25 and in which each said output core-input coupling includes a blocking oscillator whose input and feedback windings are on an output core and whose output winding is on an input core.

References Cited by the Examiner

UNITED STATES PATENTS

| | | | |
|---|---|---|---|
| 2,733,861 | 2/1956 | Rajchman | 235—61 |
| 2,875,429 | 2/1959 | Quade | 340—174 |
| 3,111,659 | 11/1963 | Warman | 340—347 |
| 3,141,158 | 7/1964 | Minnick et al. | 340—347 |

OTHER REFERENCES

Rajchman and Crane: Current Steering in Magnetic Circuits, in IRE Transactions on Electronic Computers, pp. 21–30, March 1957.

MAYNARD R. WILBUR, *Primary Examiner.*

DARYL W. COOK, *Examiner.*

A. L. NEWMAN, *Assistant Examiner.*